US005896026A

United States Patent [19]
Higgins

[11] Patent Number: 5,896,026
[45] Date of Patent: Apr. 20, 1999

[54] POWER CONSERVATION AND MANAGEMENT SYSTEM FOR A SELF-POWERED ELECTRONIC LOCK

[75] Inventor: Steven Wayne Higgins, Lexington, Ky.

[73] Assignee: Mas-Hamilton Group, Lexington, Ky.

[21] Appl. No.: 09/045,001

[22] Filed: Mar. 20, 1998

[51] Int. Cl.$^6$ ........................................... H02J 7/00
[52] U.S. Cl. ............................................. 320/166; 70/280
[58] Field of Search ..................................... 320/123, 166, 320/FOR 111, FOR 100, FOR 156, FOR 160, FOR 161, DIG. 10; 70/256, 278, 275, 277, 280

[56] References Cited

U.S. PATENT DOCUMENTS 3,733,861  5/1973  Lester .
3,978,376  8/1976  Wilson ................................. 361/172
5,647,235  7/1997  Clark et al. ........................... 70/278

Primary Examiner—Edward H. Tso
Attorney, Agent, or Firm—Frost & Jacobs LLP; Ron Letson

[57] ABSTRACT

The charge on a capacitor is supplied by a manual generator in a self-powered lock. The capacitor retains a reduced level charge after completion of the operation of the electronic lock controls that may serve as a capacitor pre-charge. The pre-charge reduces the amount of manual input to the generator required. The drain of the electronic control circuitry on the capacitor is disconnected responsive to a microprocessor command at the completion of microprocessor operations. The disconnection may occur at a higher level of charge voltage on the capacitor when the control is from the microprocessor without having to wait for charge decay to reach a disconnect or power down level based on charge voltage level.

4 Claims, 2 Drawing Sheets 5,896,026

POWER CONSERVATION AND MANAGEMENT SYSTEM FOR A SELF-POWERED ELECTRONIC LOCK

FIELD OF THE INVENTION

The invention relates to circuits that store, conserve and, thus, manage electrical energy and, specifically, circuits that store electrical energy and provide such energy to the controls of self-powered electronic locks and disconnect the power storage elements from the electronic controls to conserve the stored electrical energy for future use.

BACKGROUND OF THE INVENTION

Self-powered electronic door or passage locks have been known for some time. U.S. Pat. No. 3,733,861 to Robert W. Lester discloses a self-powered door lock having a handle operated generator for providing said power. Most electronic door locks utilize a battery or hard wiring directly or indirectly attached to a utility power source to provide either 110 or 220 volt power or some other desired voltage to the lock. For battery or hard wired house power installations, adequacy of electrical power is not a major concern due to the very large energy source available to power the lock controls.

However, in contrast, the capability of storing significant electrical energy is very limited in a self-powered lock due to the lack of a continuous source of power to operate the lock and the relatively small amount of electrical energy that may be stored within a power storage capacitor within the lock. Voltage levels on capacitors deteriorate with the use of the stored electrical energy to power and operate electronic lock controls. When the stored electrical charge deteriorates below a predetermined level, the remaining energy stored in the capacitors results in voltage levels ineffective to power the lock controls reliably. If uncontrolled, the energy stored in the capacitor dissipates and/or decays until a voltage detector detects the capacitor voltage level falling below the threshold required for reliable electronic control operation of prior locks.

Upon detection of the voltage dissipating and falling through the minimum operating voltage threshold, the detector ceases to provide an output, terminating enablement of the electronic controls. Thus, considerable power is wasted after the lock operations are complete and prior to termination of enablement of the electronic controls, which could otherwise be conserved because the minimum operating voltage threshold must be set well below the level at which the power to the electronic controls, particularly the microprocessor 20, could otherwise be terminated, in order to prevent premature cutoff of lock operations and, particularly, operations of the microprocessor which typically provides the control for the lock.

A self-powered lock must rely on operation of an input (manual input) to the generator to power the lock before each usage. It is desirable to use conserved electrical energy in the capacitor to act as a capacitor pre-charge. The capacitor pre-charge reduces the amount of manual, mechanical input required by the lock to bring the charge level of the power supply capacitor to a full initial operating charge level.

The need for multiple handle or handle lever pumps to power a lock is undesirable if it is required on every use of the lock. If the lock only requires a single handle-lever pump on most of the lock operations, a few operations requiring either two or more pumps may be tolerated by the operator without the operator having a sense or feeling of lack of proper operability.

Where excessive mechanical input is required to power the lock system, as perceived by the operator, the human factors considerations may become paramount in the selection and installation of such self-powered locks. Self-powered locks present many advantages not provided by battery powered or utility powered locks, but those advantages are overcome when the operator perceives the lock as requiring too much operational movement in order to cause the capacitor to be charged and the lock operated reliably. The perception of reliable operation is then lost to the point where a self-powered electronic lock may not be considered for a particular use or location.

OBJECTS OF THE INVENTION

It is an object of the invention to conserve the maximum amount of energy stored in the power supply capacitor of an electronic lock. Another object of the invention is to reduce and minimize the amount of mechanical input to the lock required to adequately power the lock for each operation.

It is another object of the invention to power a lock with a single handle lever pumping action, in most instances.

It is a further object of the invention to control the termination of power to the lock when the operation of the lock is electrically complete, to conserve power stored in the super capacitor, for future use.

SUMMARY OF THE INVENTION

The self-powered electronic door lock is typically powered by a handle or lever which is manually pumped or turned in an oscillatory motion to drive a stepper motor acting as a generator. Upon an initial powering of the lock, the handle is pumped several pumps or movements to fully charge the power storage capacitor. Once fully charged, the power storage capacitor achieving a predetermined voltage level, the microprocessor is powered and enabled.

This "turning on" or powering of the microprocessor is accomplished by a voltage detector, which is only active when the handle is being pumped. When the pumping of the handle is occurring, a signal generated by the generator activates the circuit branch leading to a voltage detector. When the voltage on the generator ceases to exist, as at the end of a lever pump, the branch of the circuit providing the storage capacitor charge voltage to the voltage detector ceases to function. The output of the voltage detector when enabled by the operation or pumping of the generator by the lever or lever handle and the voltage of the capacitor being at a sufficiently high level for the voltage detector to detect its threshold voltage, latches or turns on the voltage path from the storage capacitor to the microprocessor, through a voltage regulator.

With the microprocessor included in the power system control loop, an output signal from the microprocessor, indicating that the microprocessor is powered and operating, latches the power supply capacitor ON and the power path to the voltage regulator is held ON after the generator ceases to provide an enabling output. Thus, once the generator has generated sufficient power and stored the power in the capacitor to initially activate the circuitry providing the electrical power to the microprocessor, the microprocessor powers up, initializes and then provides a signal holding the power supply circuitry ON such that the electrical power continues, notwithstanding the fact that the generator has ceased to be operated.

When completing its controlling function of the lock operations for a particular operational cycle, the microprocessor provides an output signal which goes low to indirectly cause the flow of electrical power to the microprocessor to be interrupted. The microprocessor and the voltage regulator then no longer consume power and the electrical energy remaining in the capacitor is conserved for a future operation, thereby minimizing the amount of capacitor charging necessary to bring the capacitor to a fully charged and operational level. With the conserved electrical energy acting as a capacitor pre-charge, the operation of the door handle on the generator through a single pump cycle is generally adequate to charge the power supply capacitor to the voltage level required to operate the electronic lock controls.

This condition is typically met if the lock has been powered or operated at least once in the preceding 24 hour period, thereby leaving a sufficient capacitor charge or pre-charge that has not dissipated through normal and inherent leakage of the capacitor. With such a capacitor pre-charge of an adequate quantity, the amount of power required to bring the capacitor to a fully charged level and to initiate operation of the microprocessor may be generated by a single handle lever pumping action.

A more complete understanding of the invention may be had from the attached drawing and the detailed description below.

A DETAILED DESCRIPTION OF THE INVENTION

Figure 1:
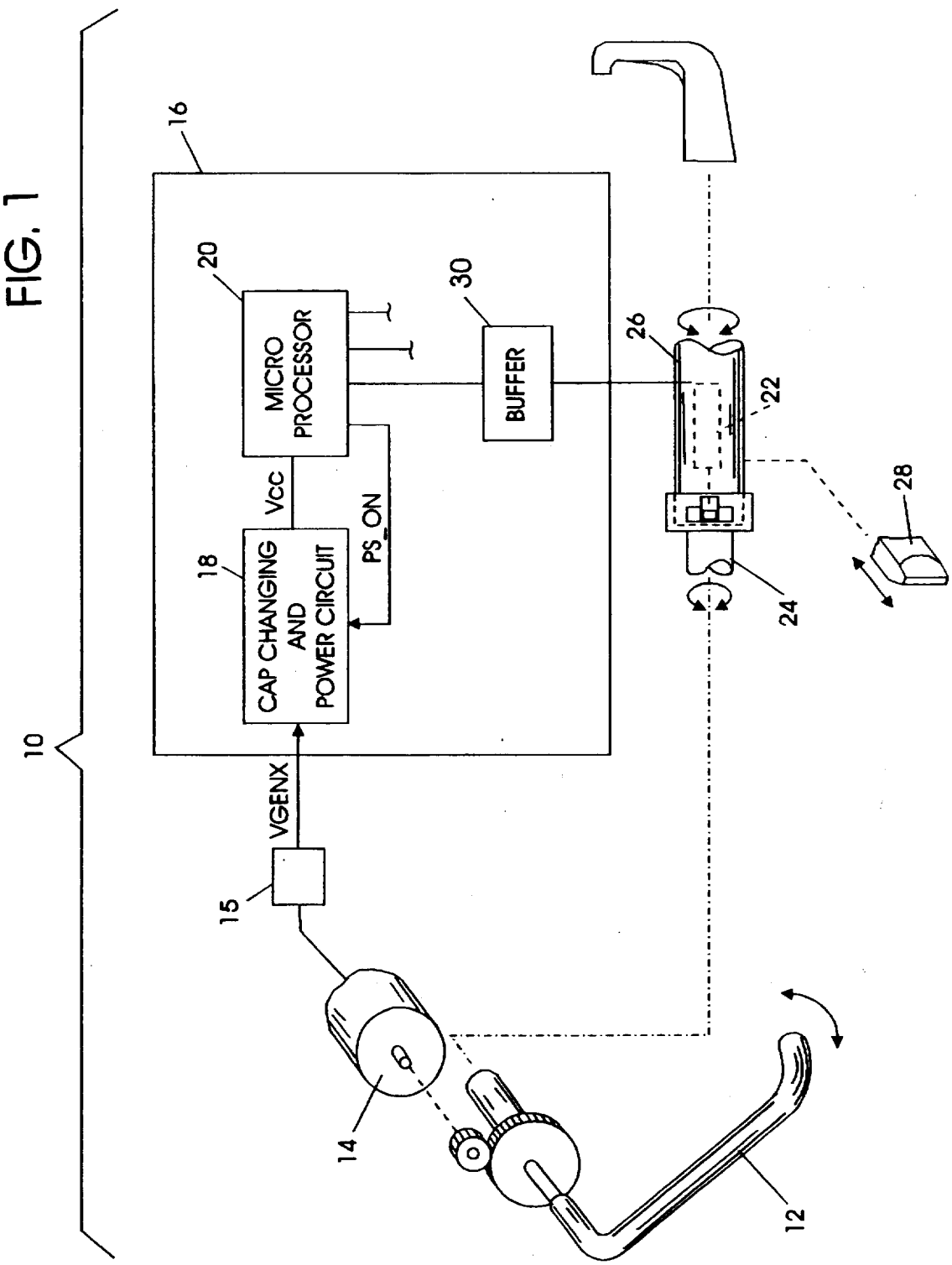
FIG. 1 is a schematic diagram of the relevant portion of the electronic self-powered door lock.

Referring initially to FIG. 1, the handle or lever 12 of lock 10 is manually movable in a pivoting or oscillatory motion to drive stepper motor/generator 14 (generator 14). The generator 14 provides the output voltage thereof to the electronic control 16 of the electronic lock 10 which includes a microprocessor 20. Microprocessor 20 receives power from the capacitor charging and power circuits 18 and provides a signal to a solenoid 22 that links torque tubes 24, 26 together to direct the mechanical motion of lever 12 to the bolt 28 for bolt withdrawal.

Figure 2:
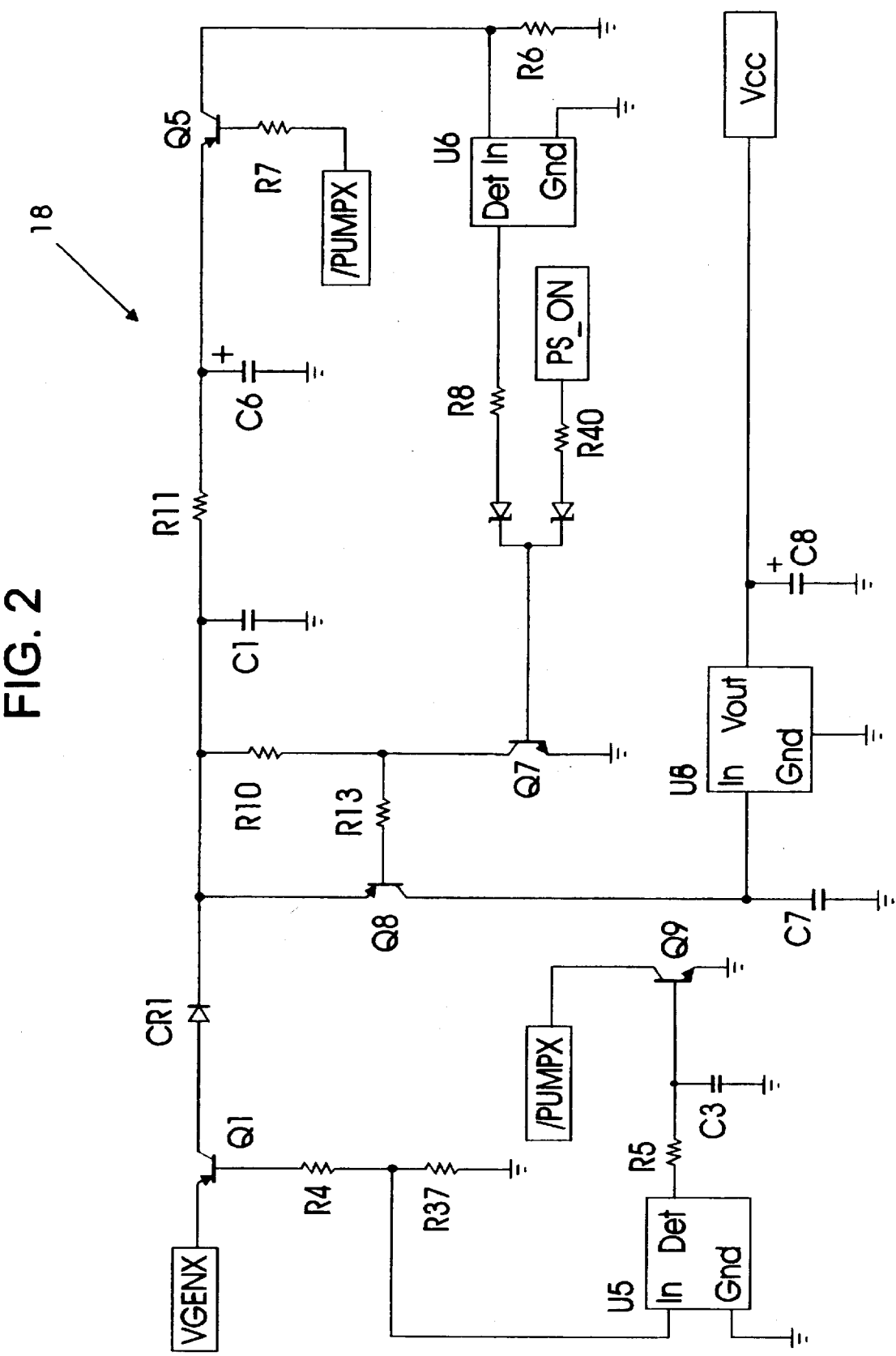
FIG. 2 is a circuit diagram of the relevant circuit for charging the capacitor and controlling the electrical energy for the electronic lock controls.

The electronic controls 16 takes the form of circuitry 18, FIG. 2, which operates to control charging of the power supply capacitor C1 and control at what point in the operation of the electronics the power supply capacitor C1 is electrically connected to the microprocessor 20 for operation of the microprocessor 20. Power supply capacitor C1 is also referred to as super capacitor C1 or super cap C1, due to its large storage capacitance relative to its size, which is sufficiently small to be enclosed within the lock housing.

The flow of the electrical current produced by the generator 14 is rectified by bridge rectifiers 15, and the resulting DC power is represented by signal VGENX on the electrical schematic diagram. When this DC power signal is applied to transistor Q1, the VGENX signal biases transistor Q1 and allows it to conduct. The majority of the current produced by generator 14 flows from the emitter of Q1 through the device, and out the collector, to charge super capacitor C1. About 5% of the current produced by the generator flows out the base of the transistor Q1 through a resistor network R4, R37 to ground. When this current flows through resistors R4 and R37, a voltage drop is produced. This reduced voltage signal is fed to voltage detector U5, which in turn controls transistor Q9. The end result is that when door handle 12 is turned, detector U5 is turned on which turns on transistor Q9, taking the/PUMPX signal low.

At this point, a signal is being produced which is dependent on the motion of the door handle, and all that remains is to couple this signal into the power supply circuitry to turn the system on and power up the system microprocessor. When the handle 12 is turned and the/PUMPX signal goes low, transistor Q5 turns on, which connects super capacitor C1 to voltage detector U6. The output of detector U6 remains low until (a) door handle 12 is being turned, and (b) the voltage on the super capacitor C1 exceeds the detection threshold. Once both conditions are met, the output of detector U6 goes high. Since the signal derived from the turning door handle lasts for approximately one second under most operating conditions, once both conditions are met there is sufficient time to apply power to voltage regulator U8 via transistors Q7 and Q8, and boot or initialize the system microprocessor 20. Once the microprocessor 20 is powered, it drives signal PS_ON high, which, in turn, latches transistors Q7 and Q8 ON, and keeps the system powered up until the end of the lock operation. Once the microprocessor 20 is fully powered and initialized, the power supply connection of capacitor C1 to microprocessor 20 is under complete control of microprocessor 20 in the system.

The output of voltage regulator U8 clearly is either ON or OFF and the output voltage of the voltage regulator U8 provides Vcc to the microprocessor 20, EEPROM, clock, and other components using Vcc, of the electronic control 16.

The output of voltage regulator U8 further provides its output voltage to microprocessor 20 as Vcc and when microprocessor 20 is powered, microprocessor 20 provides a signal, PS_ON, as an active high signal. The active high signal, PS_ON, provides a latching signal to transistor Q7 and, thus, to transistor Q8, to maintain Vcc to the microprocessor 20.

The microprocessor 20 will remain powered so long as PS_ON is high. At the end of a specific lock operation, the PS_ON signal from the microprocessor 20 is taken low, in response to the program operation of the microprocessor 20, which interrupts voltage Vcc to the microprocessor 20 causing it to power down. The PS_ON signal, after being taken low to disconnect the electrical energy supplied by super capacitor C1 to transistor Q8, the voltage regulator U8 and transistor Q7, unlatching transistor Q8, causing it to no longer conduct, isolating supercapacitor C1 from microprocessor 20 and voltage regulator U8. Accordingly, the remaining capacitive charge stored in the super cap C1 is maintained and conserved. The maintained capacitive charge acts as a pre-charge on the capacitor C1 for a future lock operation.

During normal lock operation, lock 10 is opened and the bolt 28 withdrawn after entry of a combination and operation of the microprocessor 20, by the depression of lever 12 in an additional oscillatory action. The withdrawal of bolt 28 is enabled by the microprocessor 20 signaling solenoid 22 to actuate and thereby couple torque tube 24 to torque tube 22 so that movement of lever 12 is transmitted to the lock bolt 28 to cause bolt 28 to be withdrawn and the lock 10 opened, whereby, the door or passage barrier may be opened, permitting passage.

As the door is opened, the additional turning or oscillatory motion or pumping of the lever 12 while mechanically coupled to bolt 28 for withdrawal of bolt 28 drives generator 14, thereby partially recharging super cap C1. The pumping of lever 12 and the partial recharging of super cap C1 causes the/PUMPX signal to go low, but does not reset or reinitialize the microprocessor 20 because power is already applied to microprocessor 20 via the PS_ON signal and transistors Q7 and Q8. Once the door has closed, the microprocessor relocks and powers down the lock. Thus, this partial recharging of super cap C1 enhances the capacitor pre-charge.

When the lock 10 is next operated, typically, within a short period of time, such as within 24 hours of the prior operation, the super cap C1 still has a partial charge or pre-charge of such a level or magnitude that a single pump of lever 12 is usually sufficient to bring the charge level of the super cap C1 to that level adequate to power and activate the microprocessor 20 such that microprocessor 20 may accept combinations and perform the operations necessary for the proper operation of the lock 10.

The remaining resistors, capacitors and other circuit elements not otherwise described in detail above with reference to FIG. 2 of the drawing are employed as components of time constant networks, current limiting elements, or filtering networks which are fully understood by those having ordinary skill in circuit design and electronic circuit arts; thereby not requiring further detailed description.

Values for specific circuit elements may be determined by a skilled circuit designer to accommodate and accomplish the described and disclosed functions and benefits.

One of skill in the art will understand that minor changes and alterations may be made to the invention as described without removing it from the scope of protection provided by the attached claims.

I claim:

1. An electrical power management system for a self-powered electronic lock comprising:

an electrical generator, manually driven by an operator;

an electrical energy storage device charged by operation of said generator;

a first voltage detector having a predetermined voltage activation threshold electrically connected with said storage device through a first switching circuit element for connecting a charge voltage of said storage device to said first voltage detector, said voltage detector controllingly connected with a second switching element for controlling application of said capacitor charge voltage to a voltage regulator, said voltage regulator providing an output to a microprocessor of said lock, whereby said voltage regulator output is only provided to said microprocessor when said charge voltage exceeds a predetermined voltage.

2. An electronic power management system for claim 1 further comprising a second voltage detector arranged to detect an output from said generator and control a signal indicative of said generator operation, said voltage signal controllingly connected to said first switching element, thereby providing a capacitor voltage to said first voltage detector only when said generator is generating a power output.

3. The electrical power management system of claim 2 farther comprising a third switching element connected between the output of said voltage regulator and said second switching element, said third switching element controlled by said processor to latch said second switching element in a connective state only so long as a control signal from said microprocessor maintains said second switching element operative in a conductive state.

4. An electrical power management system for a self-powered lock comprising:

a manually operated power source;

a microprocessor a capacitor chargeable by said power source and providing power to said microprocessor;

a first control providing a conductive path between said capacitor and said microprocessor upon said power source operation and said capacitor charge being at least a predetermined minimum;

a second control providing said conductive path upon obtaining and maintaining of a charge of a predetermined level on said capacitor from power source operation and operation of said microprocessor in response thereto;

said second control operative to interrupt said conductive path upon receipt of a signal from said microprocessor indicative of termination of microprocessor operations, whereby said electronic controls are disabled and disconnected from said power source at a stage of operation of said microprocessor where said microprocessor operations will not be adversely affected and remaining charge is conserved for future use thereby minimizing operations of said manually operated power source.

* * * * *